United States Patent
Lim

(10) Patent No.: US 10,865,328 B2
(45) Date of Patent: Dec. 15, 2020

(54) ROOM-TEMPERATURE-CURABLE SILICONE COMPOSITION AND ELECTRIC/ELECTRONIC APPARATUS

(71) Applicant: DOW SILICONES CORPORATION, Midland, MI (US)

(72) Inventor: Jong-Ok Lim, Chungcheongbuk-do (KR)

(73) Assignee: Dow Silicones Corporation, Midland, MI (US)

(*) Notice: Subject to any disclaimer, the term of this patent is extended or adjusted under 35 U.S.C. 154(b) by 16 days.

(21) Appl. No.: 16/485,879

(22) PCT Filed: Feb. 6, 2018

(86) PCT No.: PCT/KR2018/001527
§ 371 (c)(1),
(2) Date: Aug. 14, 2019

(87) PCT Pub. No.: WO2018/151450
PCT Pub. Date: Aug. 23, 2018

(65) Prior Publication Data
US 2020/0002535 A1    Jan. 2, 2020

(30) Foreign Application Priority Data
Feb. 20, 2017   (KR) .................. 10-2017-0022569

(51) Int. Cl.
| | |
|---|---|
| C09D 183/14 | (2006.01) |
| C08L 83/14 | (2006.01) |
| C08G 77/08 | (2006.01) |
| C08G 77/18 | (2006.01) |
| C08G 77/50 | (2006.01) |
| C08K 5/5419 | (2006.01) |
| C08K 5/57 | (2006.01) |
| C08K 13/02 | (2006.01) |
| C08L 83/06 | (2006.01) |
| C09D 183/06 | (2006.01) |

(52) U.S. Cl.
CPC .......... *C09D 183/14* (2013.01); *C08G 77/08* (2013.01); *C08G 77/18* (2013.01); *C08G 77/50* (2013.01); *C08K 5/5419* (2013.01); *C08K 5/57* (2013.01); *C08K 13/02* (2013.01); *C08L 83/06* (2013.01); *C08L 83/14* (2013.01); *C09D 183/06* (2013.01); *C08L 2203/20* (2013.01); *C08L 2205/02* (2013.01)

(58) Field of Classification Search
CPC .............................. C09D 183/14; C08L 83/14
See application file for complete search history.

(56) References Cited

U.S. PATENT DOCUMENTS

| | | | | |
|---|---|---|---|---|
| 5,340,899 A | * | 8/1994 | Altes | C08G 77/50 524/731 |
| 5,840,794 A | * | 11/1998 | Palmer | C08K 5/057 524/425 |
| 8,895,678 B2 | | 11/2014 | Yoshitake | |
| 2004/0075076 A1 | * | 4/2004 | Bhagwagar | C08L 83/04 252/70 |
| 2006/0025517 A1 | * | 2/2006 | Guichard | C08L 83/00 524/588 |
| 2009/0286916 A1 | | 11/2009 | Iwasaki et al. | |
| 2012/0020908 A1 | | 1/2012 | Paul | |
| 2014/0039059 A1 | * | 2/2014 | Oldoni | A61K 31/167 514/616 |
| 2014/0066570 A1 | | 3/2014 | Kodama et al. | |
| 2015/0140346 A1 | | 5/2015 | Iida et al. | |
| 2016/0340549 A1 | | 11/2016 | Takashima et al. | |
| 2017/0032287 A1 | * | 2/2017 | Jiang | G06Q 50/10 |
| 2017/0037287 A1 | | 2/2017 | Kodama et al. | |
| 2019/0292419 A1 | * | 9/2019 | Seitz | C09J 183/04 |

FOREIGN PATENT DOCUMENTS

WO   2015098118 A1   7/2015

OTHER PUBLICATIONS

International Search Report for PCT/KR2018/001527 dated May 8, 2018, 4 pages.

* cited by examiner

*Primary Examiner* — Marc S Zimmer
(74) *Attorney, Agent, or Firm* — Warner Norcross + Judd LLP

(57) ABSTRACT

A room-temperature-curable silicone composition is disclosed. The-room-temperature-curable silicone composition comprises: (A) an organopolysiloxane having alkoxysilyl-containing groups at both molecular terminals; (B) an organopolysiloxane resin; (C) an alkoxysilane; and (D) a condensation-reaction catalyst. The room-temperature-curable silicone composition exhibits good store stability and can form a cured product exhibiting high hardness and good thermal shock stability.

10 Claims, No Drawings

ROOM-TEMPERATURE-CURABLE SILICONE COMPOSITION AND ELECTRIC/ELECTRONIC APPARATUS

CROSS-REFERENCE TO RELATED APPLICATIONS

This application is the National Stage of International Application No. PCT/KR2018/001527 filed on 06 Feb. 2018, which claims priority to and all advantages of Korean Patent Appl. No. 10-2017-0022569 filed on 20 Feb. 2017, the content of which is hereby incorporated by reference.

TECHNICAL FIELD

The present invention relates to a room-temperature-curable silicone composition that can cure at room temperature by contact with moisture in air, and an electric/electronic apparatus obtained by using the room-temperature-curable silicone composition.

BACKGROUND ART

Room-temperature-curable silicone compositions that form cured products by curing at room temperature by contacting moisture in air are used as sealants, adhesives, or coatings of electric/electronic apparatus because they do not require heating to cure. Patent Document 1 proposes a room-temperature-curable silicone composition comprising: an organopolysiloxane having on silicon atoms in the molecular chain in one molecule at least two alkoxysilyl-containing groups, an organopolysiloxane having on silicon atom in the molecular chain neither a hydroxyl group nor an alkoxy group, an alkoxysilane or its partial hydrolysis and condensation product, and a condensation-reaction catalyst, Patent Document 2 proposes a room-temperature-curable silicone composition comprising: an organopolysiloxane having in a molecule at least two alkoxysily-containing groups on silicon atoms in the molecular chain, a diorgano-dialkoxysilane or partially hydrolyzed condensate thereof, and a condensation-reaction catalyst, and Patent Document 3 proposes a room-temperature-curable silicone composition comprising: an organopolysiloxane consisting of a both ends alkoxysilyl group-terminated polyorganosiloxane and a partial hydrolysis condensate an alkoxysilane compound, an alkoxysilane compound or a partial hydrolysis condensate thereof, and an organic titanium compound.

Especially, the room-temperature-curable silicone compositions described in Patent Document 3 forms a cured product with excellent in scratch resistance.

However, although the room-temperature-curable silicone compositions described in Patent Documents 1 to 3 form cured products with good adhesion to a substrate, they have the problem that when the cured product is subjected to thermal shock, the cured product causes cracks.

PRIOR ART REFERENCE

Patent Reference (Patent Document 1) United States Patent Application Publication No. 2014/0066570 A1
(Patent Document 2) International Publication No. WO2015/098118 A1
(Patent Document 3) United States Patent Application Publication No. 2015/0140346 A1

DISCLOSURE OF INVENTION

Technical Problem

An object of the present invention is to provide a room-temperature-curable silicone composition which exhibits good storage stability, and by curing at room temperature by contacting moisture in air, forms a cured product exhibiting high hardness and good thermal shock stability. Another object of the present invention is to provide an electric/electronic apparatus which exhibiting good reliability.

Solution to Problem

The room-temperature-curable silicone composition of the present invention comprises:

(A) 100 parts by mass of an organopolysiloxane represented by the following general formula:

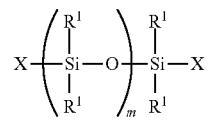

wherein each $R^1$ is the same or different monovalent hydrocarbon group lacking an aliphatic unsaturated bond, each X is an alkoxysilyl-containing group represented by the following general formula:

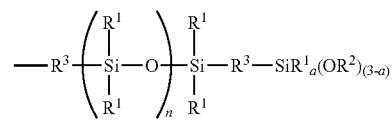

wherein each $R^1$ is as defined above, $R^2$ is an alkyl group, each $R^3$ is the same or different alkylene group, "a" is an integer from 0 to 2, and "n" is an integer from 1 to 20, and "m" is an integer from 50 to 1000;

(B) 50 to 200 parts by mass of an organopolysiloxane resin represented by the following average unit formula:

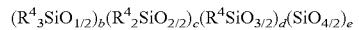

wherein each $R^4$ is the same or different monovalent hydrocarbon group, however, not more than 5 mol % of $R^4$ in a molecule are aryl groups, and "b", "c", "d" and "e" are numbers satisfied the following conditions: $0 \leq b < 0.2$, $0.1 \leq c \leq 0.5$, $0.4 < d \leq 0.9$, $0 \leq e < 0.2$, and $b+c+d+e=1$;

(C) 0.5 to 20 parts by mass of an alkoxysilane represented by the following general formula:

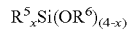

wherein $R^5$ is a monovalent hydrocarbon group, $R^6$ is an alkyl group, and "x" is an integer of from 0 to 2; and (D) 0.1 to 20 parts by mass of a condensation-reaction catalyst.

The alkoxysilyl-containing group in component (A) is preferably a group represented by the following formula:

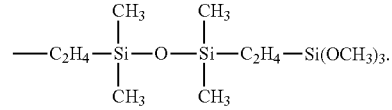

Component (B) is preferably an organopolysiloxane resin represented by the following average unit formula:

[(CH$_3$)$_2$SiO$_{2/2}$]$_{c'}$(CH$_3$SiO$_{3/2}$)$_{d'}$(C$_6$H$_5$SiO$_{3/2}$)$_{d''}$ wherein "c'", "d'" and "d''" are numbers satisfying the following conditions: $0 < c' < 1$, $0 < d' < 1$, $0 \leq d'' < 1$, and $c'+d'+d''=1$.

Component (C) is preferably dimethyldimethoxysilane and/or methyltrimethoxysilane.

More advantageously, the room-temperature-curable silicone rubber composition of the present invention further comprises (E) a fluorescent whitening agent, in an amount of 0.001 to 0.1 parts by mass per 100 parts by mass of component (A).

The room-temperature-curable silicone rubber composition of the present invention is preferably as a conformal coating agent.

The electric/electronic apparatus of the present invention is characterized by obtaining by using the room-temperature-curable silicone composition.

Advantageous Effects of Invention

The room-temperature-curable silicone composition according to the present invention, exhibits good storage stability, and by curing at room temperature by contacting moisture in air, can form a cured product exhibiting high hardness and good thermal shock stability.

Additionally, the electric/electronic apparatus according to the present invention has good reliability due to the above-mentioned high hardness and good thermal shock stability.

MODE FOR THE INVENTION

[Room-Temperature-Curable Silicone Composition]

The room-temperature-curable silicone composition according to the present invention comprises the above components (A) to (D). Such a room-temperature-curable silicone composition exhibits good storage stability, and by curing at room temperature by contacting moisture in air, can form a cured product exhibiting good adhesion to a substrate contacted during curing, and exhibiting high hardness and good thermal shock stability. Each of the components will be described in detail below. Note that in the present specification, viscosity is the value measured using a type B viscometer according to ASTM D 1084 at 23±2° C.

Component (A) is an organopolysiloxane represented by the following general formula:

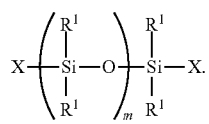

In the formula, each R$^1$ is the same or different monovalent hydrocarbon group lacking an aliphatic unsaturated bond, examples of which include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. An alkyl group, cycloalkyl group, or aryl group is preferred, and a methyl group or phenyl group is more preferred.

In the formula, "m" is an integer from 50 to 1000, preferably an integer from 50 to 500, or an integer from 50 to 300. This is because when "m" is greater than or equal to the lower limit of the range described above, elastic property of the cured product is improved, and when "m" is less than or equal to the upper limit of the range described above, miscibility, handling and process ability of the resulting composition are improved.

In the formula, each X is an alkoxysilyl-containing group represented by the following general formula:

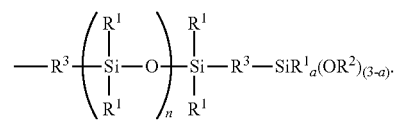

In the formula, each R$^1$ is as defined above.

In the formula, R$^2$ is an alkyl group, examples of which include a methyl group, ethyl group, propyl group, butyl group, pentyl group, hexyl group, heptyl group, octyl group, nonyl group, decyl group, and octadecyl group. A methyl group or ethyl group is preferred.

In the formula, each R$^3$ is the same or different alkylene group, examples of which include a methylmethylene group, ethylene group, methylethylene group, propylene group, butylene group, pentylene group, hexylene group, heptylene group, and octylene group. A methylmethylene group, ethylene group, methylethylene group, or propylene group is preferred.

In the formula, "a" is an integer from 0 to 2, preferably 0 or 1.

In the formula, "n" is an integer from 1 to 20, preferably an integer from 1 to 10, or an integer from 1 to 5.

Examples of such alkoxysilyl-containing groups include groups represented by the following formula:

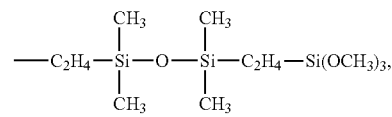

groups represented by the following formula:

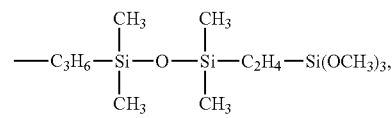

groups represented by the following formula:

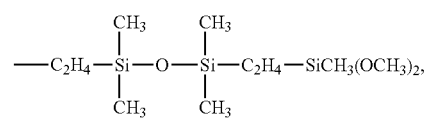

groups represented by the following formula:

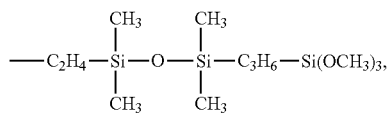

groups represented by the following formula:

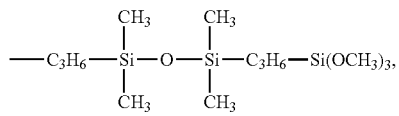

groups represented by the following formula:

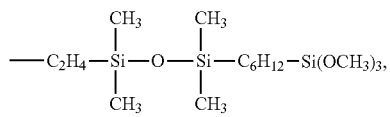

and groups represented by the following formula:

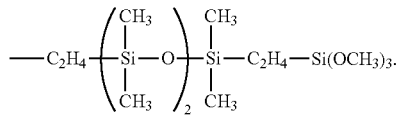

The viscosity at 23±2° C. of component (A) is not limited, but is preferably in a range of 100 to 10,000 mPa·s, or in a range of 100 to 1,000 mPa·s. This is because when the viscosity of component (A) is greater than or equal to the minimum value of the range given above, elastic property of the cured product is improved, and when it is less than or equal to the maximum value of the range given above, miscibility, handling and process ability of the resulting composition are improved.

Component (B) is an organopolysiloxane resin represented by the following average unit formula:

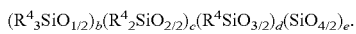

In the formula, each $R^4$ is the same or different monovalent hydrocarbon group, examples of which include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. An alkyl group, cycloalkyl group, or aryl group is preferred, and a methyl group or phenyl group is more preferred. However, not more than 5 mol % of $R^4$ in a molecule are aryl groups. This is because when the content of aryl groups in component (B) is less than or equal to the upper limit of the range described above, the resulting composition exhibits good storage stability, and the resulting cured product exhibits good thermal shock stability.

In the formula, "b", "c", "d" and "e" are numbers satisfied the following conditions: $0 \leq b < 0.2$, $0.1 \leq c \leq 0.5$, $0.4 < d \leq 0.9$, $0 \leq e < 0.2$, and $b+c+d+e=1$.

Examples of such component (B) include an organopolysiloxane resin represented by the following average unit formula:

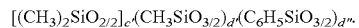

In the formula, "c'", "d'" and "d''" are numbers satisfying the following conditions: $0 < c' < 1$, $0 < d' < 1$, $0 \leq d'' < 1$, and $c'+d'+d''=1$.

Component (B) generally has a molecular weight distribution and is a mixture of a plurality of organopolysiloxane resins. In addition, component (B) may be obtained by blending individually prepared organopolysiloxane resins. In such cases, each organopolysiloxane resin need not correspond to the average unit formula specified above, and the mixture thereof may satisfy the above-mentioned average unit formula.

The content of component (B) is in the range of 50 to 200 parts by mass, preferably in the range of 80 to 200 parts by mass, or in the range of 100 to 200 parts by mass, relative to 100 parts by mass of component (A). This is because when the content of component (B) is greater than or equal to the lower limit of the range described above, the thermal shock stability of the resulting cured product is improved, and when the content is less than or equal to the upper limit of the range described above, hardness is improved with good thermal shock stability.

Component (C) is an alkoxysilane represented by the general formula:

In the formula, $R^5$ is a monovalent hydrocarbon group, examples of which include alkyl groups such as a methyl group, ethyl group, propyl group, butyl group, pentyl group, hexyl group, heptyl group, octyl group, nonyl group, decyl group, and octadecyl group; cycloalkyl groups such as a cyclopentyl group and cyclohexyl group; alkenyl groups such as a vinyl group, allyl group, butenyl groups, pentenyl groups, hexenyl group, heptenyl group, octenyl group, nonenyl group, decenyl group, and octadecenyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. An alkyl group or alkenyl group is preferred, and a methyl group or vinyl group is more preferred.

In the formula, $R^6$ is an alkyl group, examples of which include a methyl group, ethyl group, propyl group, butyl group, pentyl group, hexyl group, heptyl group, octyl group, nonyl group, decyl group, and octadecyl group. A methyl group or ethyl group is preferred.

In the formula, "x" is an integer of from 0 to 2, preferably 1 or 2.

Examples of component (C) include dimethyldimethoxysilane, methyltrimethoxysilane, methylphenyldimethoxysilane, and dimethyldiethoxysilane. Component (C) may be one of these alkoxysilanes or a combination of two or more used as a mixture. Component (C) is preferably dimethyldimethoxysilane and/or methyltrimethoxysilane.

The content of component (C) is in the range of 0.5 to 20 parts by mass, preferably, in the range of 1 to 20 parts by mass, in the range of 1 to 15 parts by mass, or in the range of 0.5 to 10 parts by mass, relative to 100 parts by mass of component (A). This is because when the content of component (C) is greater than or equal to the lower limit of the range described above, the resulting composition cures rapidly by moisture in air, and when the content is less than or equal to the upper limit of the range described above, the curability of the resulting composition is sufficient and the shelf life of the resulting composition under moisture blocking is improved.

Component (D) is a condensation-reaction catalyst. Examples of component (D) include tin compounds such as dimethyltin dineodecanoate, stannous octoate, and the like; titanium compounds such as tetra(isopropoxy)titanium, tetra(n-butoxy)titanium, tetra(t-butoxy)titanium, di(isopropoxy)bis(ethylacetoacetate)titanium, di(isopropoxy)bis(methylacetoacetate)titanium, di(isopropoxy)bis(acetylacetonate)titanium, and the like.

The content of component (D) is in the range of 0.1 to 20 parts by mass, preferably 0.1 to 15 parts by mass, or 1 to 15 parts by mass, relative to 100 parts by mass of component (A). This is because when the content of component (D) is greater than or equal to the lower limit of the range described above, the resulting composition cures sufficiently by moisture in air, and when the content is less than or equal to the upper limit of the range described above, surface cure rate of the resulting composition is improved.

The room-temperature-curable silicone rubber composition may further comprise (E) a fluorescent whitening agent. Component (E) are exemplified by benzoxazole derivatives such as 2,5-thiophenediylbis(5-tert-butyl-1,3-benzoxazole), which are commercially available under the trade name Tinopal OB from BASF; diaminostilbene-sulphonic acid derivative such as disodium salt of 4,4'-bis-(2-morpholino-4 anilino-s-triazin-6-ylamino) stilbene disulphonate, which are commercially available under the trade name Tinopal DMS from Ciba-Geigy AG; bisphenyl-distyryl derivatives such as disodium salt of 2,2'-bis-(phenyl-styryl) disulphonate, which are commercially available under the trade name Tinopal CBS from Ciba-Geigy AG; and diarylpyrazoline derivatives.

There is no limitation on the content of component (E), but, for example, it is preferably in the range of 0.001 to 0.1 parts by mass, in the range of 0.005 to 0.1 parts by mass, in the range of 0.01 to 0.1 parts by mass, or in the range of 0.01 to 0.5 parts by mass, relative to 100 parts by mass of component (A). This is because when the content of component (E) is in the range described above, visibility of a coating the resulting composition is improved under UV light exposure.

The room-temperature-curable silicone rubber composition according to the present invention may also contain a chemical reagent for component (D). Examples of the chemical reagent include alpha-substituted aceto-acetic esters such as methylacetoacetate, ethylacetoacetate, or the like. The content of the chemical reagent is not limited provided that it is an amount that can impart sufficient stability of component (D), but it is preferably in the range of 0.01 to 20 parts by mass or in the range of 0.01 to 15 parts by mass relative to 100 parts by mass of component (A).

The room-temperature-curable silicone rubber composition according to the present invention may also contain components other than components (A) to (D); for example, it may further comprise an adhesion promoter, or the like.

Examples of the adhesion promoter include epoxy group-containing alkoxysilanes such as 3-glycidoxytrimethoxysilane, 3-glycidoxypropyltriethoxysilane, 3-glycidoxypropylmethoxysilane, 2-(3,4-epoxycyclohexyl) ethyltrimethoxysilane, and 4-oxysilanylbutyltrimethoxysilane; acrylic group-containing alkoxysilanes such as 3-methacryloxypropyltrimethoxysilane, 3-methacryloxypropyltriethoxysilane, and 3-acryloxypropyltrimethoxysilane; amino group-containing alkoxysilanes such as 3-aminopropyltrimethoxysilane, 3-aminopropyltriethoxysilane, N-(2-aminoethyl)-3-aminopropyltrimethoxysilane, and N-phenyl-3-aminopropyltrimethoxysilane; and reaction mixtures of the above epoxy group-containing alkoxysilanes and the above amino group-containing alkoxysilanes. Reaction mixtures of the above epoxy group-containing alkoxysilanes and the above amino group-containing alkoxysilanes are preferred. The content of the adhesion promoter is not limited provided that it is an amount that can impart sufficient adhesion to the organic resin that the present composition contacts during curing, but it is preferably in the range of 0.01 to 10 parts by mass or in the range of 0.01 to 5 parts by mass relative to 100 parts by mass of component (A).

[Electric/Electronic Apparatus]

The electric/electronic apparatus according to the present invention is obtained by using the room-temperature-curable silicone composition described above. The electric/electronic apparatus is not particularly limited, but is exemplified by electric/electronic apparatus that contain electrical circuits, electrodes, or the like. Such electric/electronic apparatus have good reliability due to good adhesion to the substrate contacted during curing of the cured product, and good thermal shock stability.

EXAMPLES

The room-temperature-curable silicone composition of the present invention will now be described using Practical Examples. Note that in Practical and Comparative Examples, viscosity of an organopolysiloxane and the room-temperature-curable silicone composition, storage stability and tack free time of the room-temperature-curable silicone composition, and hardness and thermal shock stability of the cured product obtained by curing the room-temperature-curable silicone composition were evaluated as follows.

[Viscosity]

Viscosity at 23±2° C. was measured by using a type B viscometer (Brookfield LVF Type Rotational Viscometer with using Spindle #2 at 60 rpm) according to ASTM D 1084 "Standard Test Methods for Viscosity of Adhesive".

[Appearance and Storage Stability of the Room-Temperature-Curable Silicone Composition]

After mixing components to produce the room-temperature-curable silicone composition, mixing status, uniformity during storage and cured product surface were observed by visual.

[Tack Free Time of the Room-Temperature-Curable Silicone Composition]

Tack free time at 23±2° C. and 50±5% RH of the room-temperature-curable silicone composition was measured according to JIS K 6249 "Testing methods for uncured and cured silicone rubber".

[Hardness of the Cured Product]

A cured product with 6 mm thickness was obtained by curing the room-temperature-curable silicone composition for 7 days at 23±2° C., 50±5% RH. Then, hardness of the cured product was measured by using Shore A hardness according to ASTM D 2240 "Standard Test Method for Rubber Property—Durometer Hardness".

[Thermal Shock Stability of the Cured Product]

Thermal shock stability of the cured product was evaluated according to IPC-CC-830 "Qualification and Performance of Electrical insulating Compound for Printing Wiring Assemblies". That is, coated specimen was prepared by coating a printed circuit board with the room-temperature-curable silicone composition, and curing the composition for 4 days at 23±2° C., 50±5% RH. The coated specimen was subjected to a thermal cycle with test condition that low temperature was −40° C. and high temperature was +125° C. After 500 thermal cycles, surface of the cured product was observed.

Practical Example 1

A room-temperature-curable silicone rubber composition was prepared by uniformly mixing: 100 parts by mass of straight-chain dimethylpolysiloxane having viscosity of 500 mPa·s, and represented by the following formula:

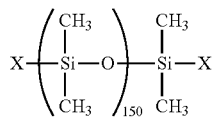

wherein each X is a trimethoxysilylethyl-containing group represented by the following formula:

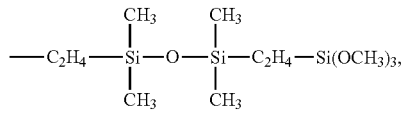

120 parts by mass of an organopolysiloxane resin represented by the following average unit formula:

$[(CH_3)_2SiO_{2/2}]_{0.18}(CH_3SiO_{3/2})_{0.79}(C_6H_5SiO_{3/2})_{0.03}$, which is consisting of 75 parts by mass of an organopolysiloxane resin represented by the following average unit formula:

$[(CH_3)_2SiO_{2/2}]_{0.01}(CH_3SiO_{3/2})_{0.99}$ and 45 parts by mass of an organopolysiloxane resin represented by the following average unit formula:

$[(CH_3)_2SiO_{2/2}]_{0.46}(CH_3SiO_{3/2})_{0.47}(C_6H_5SiO_{3/2})_{0.07}$, 3.5 parts by mass of dimethyldimethoxysilane, 8.4 parts by mass of tetra-tert-butyl titanate, and 0.02 parts by mass of 2,5-thiophenediylbis(5-tert-butyl-1,3-benzoxazole) (Tinopal OB) under moisture blocking. The properties of the room-temperature-curable silicone composition and the cured product obtained by curing the room-temperature-curable silicone compositions were evaluated. These results are shown in Table 1.

Practical Example 2

A room-temperature-curable silicone composition was prepared by the same method described in Practical Example 1 except that methyltrimethoxysilane was used instead of dimethyldimethoxysilane. The properties of the room-temperature-curable silicone composition and the cured product obtained by curing the room-temperature-curable silicone compositions were evaluated. These results are shown in Table 1.

Practical Example 3

A room-temperature-curable silicone rubber composition was prepared by uniformly mixing: 100 parts by mass of straight-chain dimethylpolysiloxane having viscosity of 500 mPa·s, and represented by the following formula:

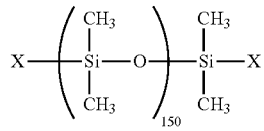

wherein each X is a trimethoxysilylethyl-containing group represented by the following formula:

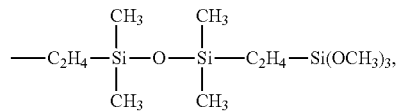

145 parts by mass of an organopolysiloxane resin represented by the following average unit formula:

$[(CH_3)_2SiO_{2/2}]_{0.42}(CH_3SiO_{3/2})_{0.52}(C_6H_5SiO_{3/2})_{0.06}$, which is consisting of 12 parts by mass of an organopolysiloxane resin represented by the following average unit formula:

$[(CH_3)_2SiO_{2/2}]_{0.01}(CH_3SiO_{3/2})_{0.99}$ and 133 parts by mass of an organopolysiloxane resin represented by the following average unit formula:

$[(CH_3)_2SiO_{2/2}]_{0.46}(CH_3SiO_{3/2})_{0.47}(C_6H_5SiO_{3/2})_{0.07}$, 4.9 parts by mass of dimethyldimethoxysilane, 10.2 parts by mass of tetra-tert-butyl titanate, 3.49 parts by mass of methylacetoacetate, and 0.03 parts by mass of 2,5-thiophenediylbis(5-tert-butyl-1,3-benzoxazole) (Tinopal OB) under moisture blocking. The properties of the room-temperature-curable silicone composition and the cured product obtained by curing the room-temperature-curable silicone compositions were evaluated. These results are shown in Table 1.

Practical Example 4

A room-temperature-curable silicone composition was prepared by the same method described in Practical Example 3 except that an organopolysiloxane resin represented by the following average unit formula:

$[(CH_3)_2SiO_{2/2}]_{0.42}(CH_3SiO_{3/2})_{0.56}(C_6H_5SiO_{3/2})_{0.02}$, which is consisting of 12 parts by mass of an organopolysiloxane resin represented by the following average unit formula:

$[(CH_3)_2SiO_{2/2}]_{0.01}(CH_3SiO_{3/2})_{0.99}$, 32 parts by mass of an organopolysiloxane resin represented by the following average unit formula:

$[(CH_3)_2SiO_{2/2}]_{0.46}(CH_3SiO_{3/2})_{0.47}(C_6H_5SiO_{3/2})_{0.07}$, and 101 part by mass of an organopolysiloxane resin represented by the following average unit formula:

$[(CH_3)_2SiO_{2/2}]_{0.46}(CH_3SiO_{3/2})_{0.54}$, was used instead of the organopolysiloxane resin of Practical Example 3. The properties of the room-temperature-curable silicone composition and the cured product obtained by curing the room-temperature-curable silicone compositions were evaluated. These results are shown in Table 1.

Practical Example 5

A room-temperature-curable silicone composition was prepared by the same method described in Practical Example 3 except that an organopolysiloxane resin represented by the following average unit formula:

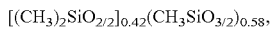

which is consisting of 12 parts by mass of an organopolysiloxane resin represented by the following average unit formula:

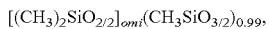

133 parts by mass of an organopolysiloxane resin represented by the following average unit formula:

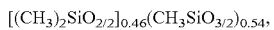

was used instead of the organopolysiloxane resin of Practical Example 3. The properties of the room-temperature-curable silicone composition and the cured product obtained by curing the room-temperature-curable silicone compositions were evaluated. These results are shown in Table 1.

Practical Example 6

A room-temperature-curable silicone rubber composition was prepared by uniformly mixing: 100 parts by mass of straight-chain dimethylpolysiloxane having viscosity of 500 mPa·s, and represented by the following formula:

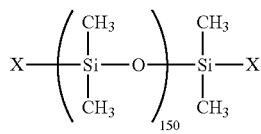

wherein each X is a trimethoxysilylethyl-containing group represented by the following formula:

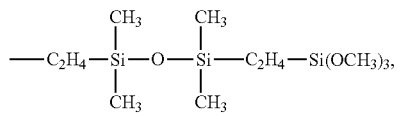

152 parts by mass of an organopolysiloxane resin represented by the following average unit formula:

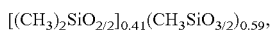

which is consisting of 18 parts by mass of an organopolysiloxane resin represented by the following average unit formula:

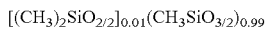

and 134 parts by mass of an organopolysiloxane resin represented by the following average unit formula:

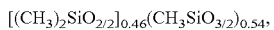

7.9 parts by mass of dimethyldimethoxysilane, 11.4 parts by mass of tetra-tert-butyl titanate, 7.8 parts by mass of methylacetoacetate, and 0.03 parts by mass of 2,5-thiophenediylbis(5-tert-butyl-1,3-benzoxazole) (Tinopal OB) under moisture blocking. The properties of the room-temperature-curable silicone composition and the cured product obtained by curing the room-temperature-curable silicone compositions were evaluated. These results are shown in Table 1.

Practical Example 7

A room-temperature-curable silicone rubber composition was prepared by uniformly mixing: 100 parts by mass of straight-chain dimethylpolysiloxane having viscosity of 500 mPa·s, and represented by the following formula:

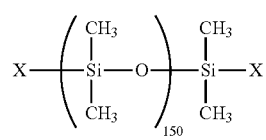

wherein each X is a trimethoxysilylethyl-containing group represented by the following formula:

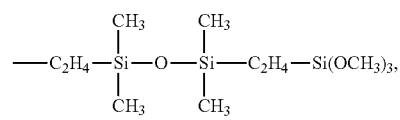

190 parts by mass of an organopolysiloxane resin represented by the following average unit formula:

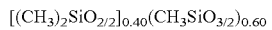

which is consisting of 25 parts by mass of an organopolysiloxane resin represented by the following average unit formula:

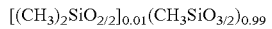

and 165 parts by mass of an organopolysiloxane resin represented by the following average unit formula:

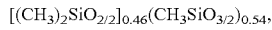

9.0 parts by mass of dimethyldimethoxysilane, 12 parts by mass of tetra-tert-butyl titanate, 8.0 parts by mass of methylacetoacetate, and 0.03 parts by mass of 2,5-thiophenediyl-bis(5-tert-butyl-1,3-benzoxazole) (Tinopal OB) under moisture blocking. The properties of the room-temperature-curable silicone composition and the cured product obtained by curing the room-temperature-curable silicone compositions were evaluated. These results are shown in Table 1.

Comparative Example 1

A room-temperature-curable silicone rubber composition was prepared by uniformly mixing: 100 parts by mass of straight-chain dimethylpolysiloxane having viscosity of 500 mPa·s, and represented by the following formula:

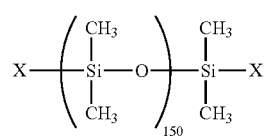

wherein each X is a trimethoxysilylethyl-containing group represented by the following formula:

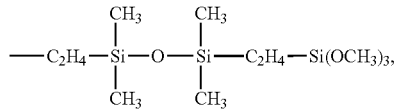

108 parts by mass of an organopolysiloxane resin represented by the following average unit formula:

$[(CH_3)_2SiO_{2/2}]_{0.34}(CH_3SiO_{3/2})_{0.50}(C_6H_5SiO_{3/2})_{0.16}$, which is consisting of 54 parts by mass of an organopolysiloxane resin represented by the following average unit formula:

$[(CH_3)_2SiO_{2/2}]_{0.01}(CH_3SiO_{3/2})_{0.99}$ and 54 parts by mass of an organopolysiloxane resin represented by the following average unit formula:

$[(CH_3)_2SiO_{2/2}]_{0.67}(C_6H_5SiO_{3/2})_{0.33}$, 9.0 parts by mass of dimethyldimethoxysilane, 7.9 parts by mass of tetra-tert-butyl titanate, and 0.02 parts by mass of 2,5-thiophenediylbis(5-tert-butyl-1,3-benzoxazole) (Tinopal OB) under moisture blocking. The properties of the room-temperature-curable silicone composition and the cured product obtained by curing the room-temperature-curable silicone compositions were evaluated. These results are shown in Table 1.

Comparative Example 2

A room-temperature-curable silicone composition was prepared by the same method described in Comparative Example 1 except that an organopolysiloxane resin represented by the following average unit formula:

$[(CH_3)_2SiO_{2/2}]_{0.21}(CH_3SiO_{3/2})_{0.71}(C_6H_5SiO_{3/2})_{0.08}$, which is consisting of 54 parts by mass of an organopolysiloxane resin represented by the following average unit formula:

$[(CH_3)_2SiO_{2/2}]_{0.01}(CH_3SiO_{3/2})_{0.99}$, 54 parts by mass of an organopolysiloxane resin represented by the following average unit formula:

$[(CH_3)_2SiO_{2/2}]_{0.42}(CH_3SiO_{3/2})_{0.42}(C_6H_5SiO_{3/2})_{0.16}$, was used instead of the organopolysiloxane resin of Comparative Example 1. The properties of the room-temperature-curable silicone composition and the cured product obtained by curing the room-temperature-curable silicone compositions were evaluated. These results are shown in Table 1.

Comparative Example 3

A room-temperature-curable silicone rubber composition was prepared by uniformly mixing: 100 parts by mass of straight-chain dimethylpolysiloxane having viscosity of 500 mPa·s, and represented by the following formula:

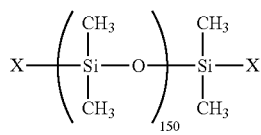

wherein each X is a trimethoxysilylethyl-containing group represented by the following formula:

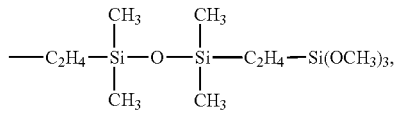

231 parts by mass of an organopolysiloxane resin represented by the following average unit formula:

$[(CH_3)_2SiO_{2/2}]_{0.46}(CH_3SiO_{3/2})_{0.52}(C_6H_5SiO_{3/2})_{0.02}$, which is consisting of 81 parts by mass of an organopolysiloxane resin represented by the following average unit formula:

$[(CH_3)_2SiO_{2/2}]_{0.46}(CH_3SiO_{3/2})_{0.47}(C_6H_5SiO_{3/2})_{0.07}$ and 150 parts by mass of an organopolysiloxane resin represented by the following average unit formula:

$[(CH_3)_2SiO_{2/2}]_{0.46}(CH_3SiO_{3/2})_{0.54}$, 6.0 parts by mass of dimethyldimethoxysilane, 13.3 parts by mass of tetra-tert-butyl titanate, and 0.04 parts by mass of 2,5-thiophenediylbis(5-tert-butyl-1,3-benzoxazole) (Tinopal OB) under moisture blocking. The properties of the room-temperature-curable silicone composition and the cured product obtained by curing the room-temperature-curable silicone compositions were evaluated. These results are shown in Table 1.

Comparative Example 4

A room-temperature-curable silicone rubber composition was prepared by uniformly mixing: 100 parts by mass of straight-chain dimethylpolysiloxane having viscosity of 500 mPa·s, and represented by the following formula:

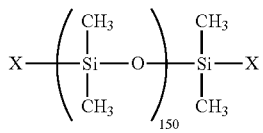

wherein each X is a trimethoxysilylethyl-containing group represented by the following formula:

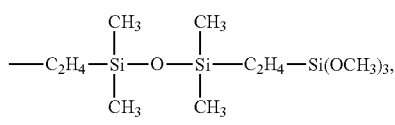

124.5 parts by mass of an organopolysiloxane resin represented by the following average unit formula:

$[(CH_3)_3SiO_{1/2}]_{0.48}(SiO_{4/2})_{0.52}$, 7.3 parts by mass of dimethyldimethoxysilane, 10.6 parts by mass of tetra-tert-butyl titanate, and 0.03 parts by mass of 2,5-thiophenediylbis(5-tert-butyl-1,3-benzoxazole) (Tinopal OB) under moisture blocking. The properties of the room-temperature-curable silicone composition and the cured product obtained by curing the room-temperature-curable silicone compositions were evaluated. These results are shown in Table 1.

TABLE 1

| | Practical Example | | | | | | |
|---|---|---|---|---|---|---|---|
| | 1 | 2 | 3 | 4 | 5 | 6 | 7 |
| Appearance | Clear | Cloudy | Clear | Clear | Clear | Clear | Clear |
| Storage Stability | Uniform | Uniform | Uniform | Uniform | Uniform | Uniform | Uniform |
| Tack free time (min.) | 5 | 6 | 4 | 4 | 4 | 5 | 7 |
| Hardness | 64 | 64 | 72 | 72 | 74 | 74 | 79 |
| Viscosity (Pa · s) | 126 | 128 | 113 | 110 | 108 | 90 | 82 |
| Thermal shock stability | No Crack | No Crack | No Crack | No Crack | No Crack | No Crack | No Crack |

| | Comparative Examples | | | |
|---|---|---|---|---|
| | 1 | 2 | 3 | 4 |
| Appearance | Cloudy | Cloudy | Clear | Clear |
| Storage Stability | Separation | Separation | Uniform | Uniform |
| Tack free time (min.) | 5 | 5 | 7 | 4 |
| Hardness | 47 | 43 | 57 | 20 |
| Viscosity (Pa · s) | 151 | 164 | 108 | 226 |
| Thermal shock stability | No crack | No crack | Crack | No crack |

INDUSTRIAL APPLICABILITY

The room-temperature-curable silicone composition of the present invention is advantageously used as a conformal coating of an electric/electronic apparatus, because it cures at room temperature by contact with moisture in air and forms a cured product that exhibits good adhesion to the substrate contacted during curing, good hardness, and good thermal shock stability.

The invention claimed is:

1. A room-temperature-curable silicone composition comprising:

(A) 100 parts by mass of an organopolysiloxane represented by the following general formula:

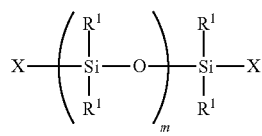

wherein each $R^1$ is the same or different monovalent hydrocarbon group lacking an aliphatic unsaturated bond, each X is an alkoxysilyl-containing group represented by the following general formula:

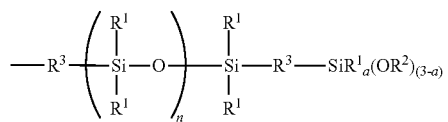

wherein each $R^1$ is as defined above, $R^2$ is an alkyl group, each $R^3$ is the same or different alkylene group, "a" is an integer from 0 to 2, and "n" is an integer from 1 to 20, and "m" is an integer from 50 to 1000;

(B) 50 to 200 parts by mass of an organopolysiloxane resin represented by the following average unit formula:

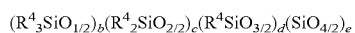

wherein each $R^4$ is the same or different monovalent hydrocarbon group, however, not more than 5 mol % of $R^4$ in a molecule are aryl groups, and "b", "c", "d" and "e" are numbers satisfying the following conditions: $0 \le b < 0.2$, $0.1 \le c \le 0.5$, $0.4 < d \le 0.9$, $0 \le e < 0.2$, and $b+c+d+e=1$;

(C) 0.5 to 20 parts by mass of an alkoxysilane represented by the following general formula:

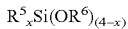

wherein $R^5$ is a monovalent hydrocarbon group, $R^6$ is an alkyl group, and "x" is an integer of from 0 to 2; and (D) 0.1 to 20 parts by mass of a condensation-reaction catalyst.

2. The room-temperature-curable silicone composition according to claim 1, wherein the alkoxysilyl-containing group in component (A) is a group represented by the following formula:

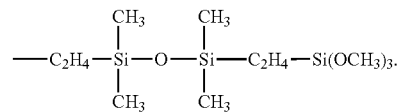

3. The room-temperature-curable silicone composition according to claim 1, wherein component (B) is an organopolysiloxane resin represented by the following average unit formula:

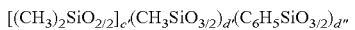

wherein "c'", "d'" and "d''" are numbers satisfying the following conditions: $0 < c' < 1, 0 < d' < 1, 0 \le d'' < 1$, and $c'+d'+d''=1$.

4. The room-temperature-curable silicone composition according to claim 1, wherein component (C) is dimethyldimethoxysilane and/or methyltrimethoxysilane.

5. The room-temperature-curable silicone composition according to claim 1, further comprising (E) a fluorescent whitening agent, in an amount of 0.001 to 0.1 parts by mass per 100 parts by mass of component (A).

6. A conformal coating agent comprising the room-temperature-curable silicone composition according to claim 1.

7. An electric/electronic apparatus obtained by using the room-temperature-curable silicone composition according to claim 1.

8. The room-temperature-curable silicone composition according to claim 2, wherein component (B) is an organopolysiloxane resin represented by the following average unit formula:

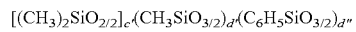

wherein "c'", "d'" and "d''" are numbers satisfying the following conditions: $0<c'<1, 0<d'<1, 0\leq d''<1$, and $c'+d'+d''=1$.

9. The room-temperature-curable silicone composition according to claim 8, wherein component (C) is dimethyldimethoxysilane and/or methyltrimethoxysilane.

10. The room-temperature-curable silicone composition according to claim 9, further comprising (E) a fluorescent whitening agent, in an amount of 0.001 to 0.1 parts by mass per 100 parts by mass of component (A).

* * * * *